United States Patent Office 3,168,871
Patented Feb. 9, 1965

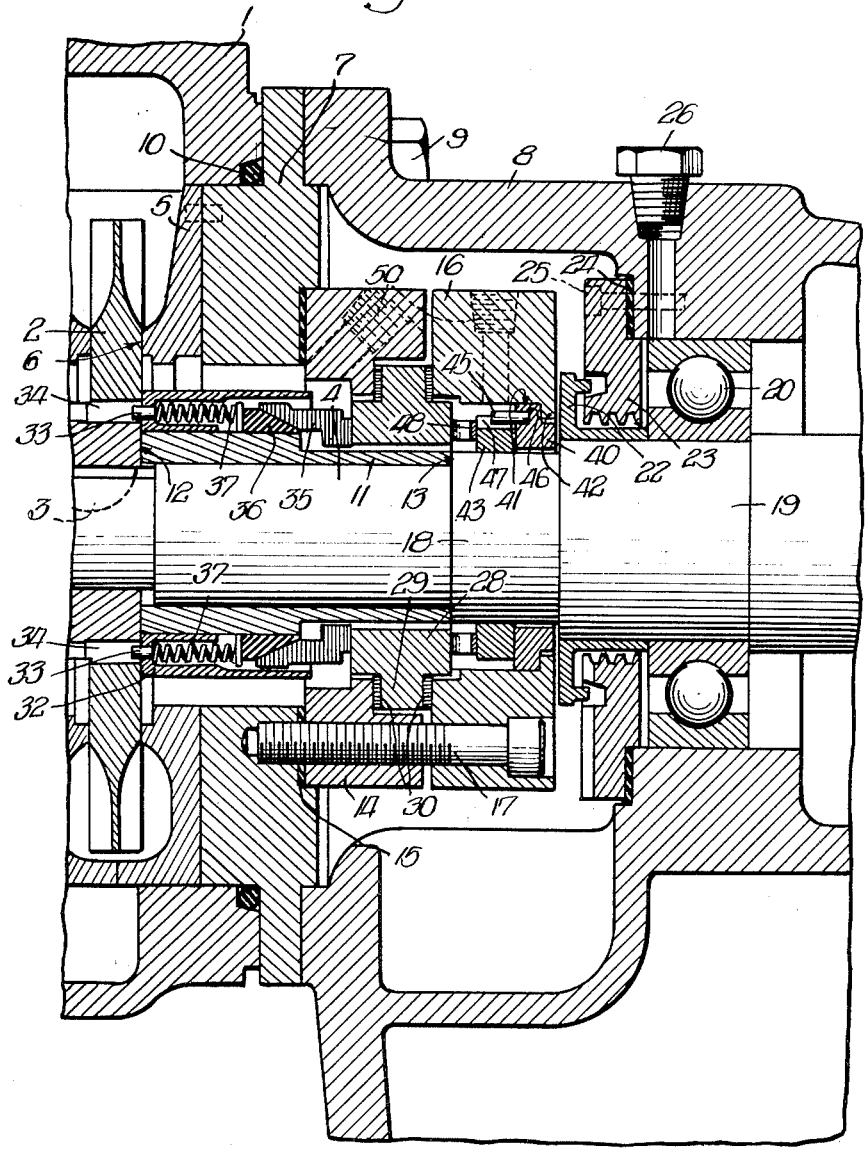

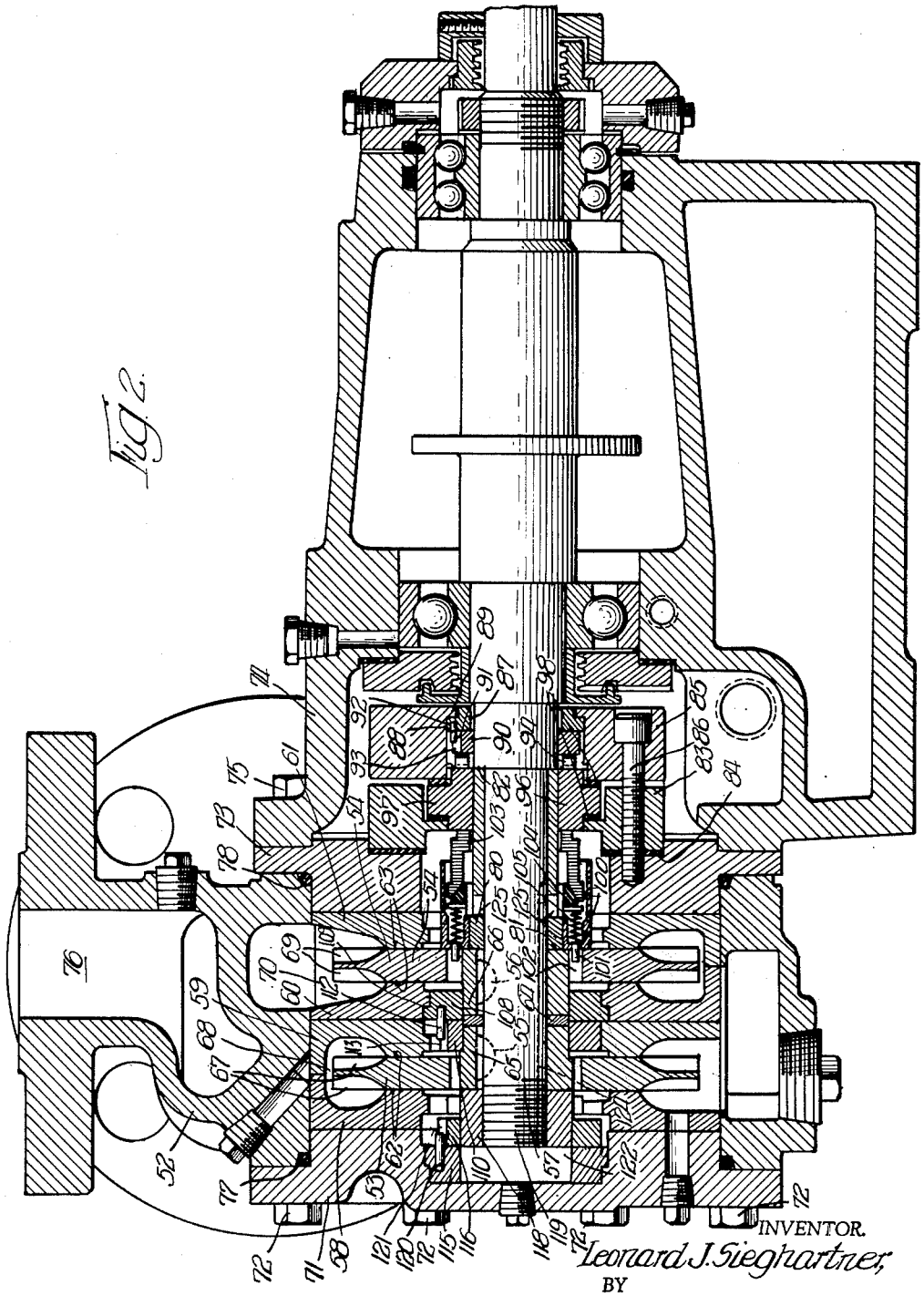

3,168,871
MEANS FOR CONTROLLING PRESSURE DROP BETWEEN ADJACENT CHAMBERS OF A PUMP OR FROM INSIDE OF PUMP CASE TO OUTSIDE ATMOSPHERE
Leonard J. Sieghartner, Coal Valley, Ill., assignor to Roy E. Roth Company, Rock Island, Ill., a corporation of Illinois
Filed July 10, 1962, Ser. No. 208,731
7 Claims. (Cl. 103—108)

This invention relates, in general, to sealing means, and has particular relation to an improved seal for rotary pump shafts and the like.

Heretofore, it has been the practice to employ packing or gaskets for sealing the shafts of pumps, and the like. Packing, gaskets and the like prevent handling of liquids which are not compatible with the packing or gasket material, or present a problem in this regard.

Other arrangements have contemplated not only gasketed sealing means, but also an additional pump for providing a higher pressure than the pressure in the impeller chamber of the pump.

The seal according to the present invention may be used externally of an internal seal, or internally in the same manner and in the same places as are the seals with close fitting rings which rotate with the shaft as covered by my copending application, Serial No. 185,391, filed April 5, 1962, now U.S. Patent No. 3,154,020, i.e., as an interstage seal for sealing one stage of a pump from another stage, or for reducing end thrust on the shaft, or for sealing or forming a close restriction to flow outwardly from one or more stages of a pump.

One of the main features of the present invention resides in the provision of an improved seal comprising a single piece floating ring bored to a close fit on the shaft with no pressure inward on the shaft and held against rotation with the shaft, or stationary with respect to rotation of the shaft and a stationary seal bushing, and in which the ring is forced against the bushing to seal, or form a close restriction to flow along the shaft. The floating ring may be bored out to a much closer fit on the shaft than would be allowable on the solid bushing.

Another feature resides in the provision of a self-aligning seal wherein the interface between the non-rotating ring and the stationary bushing allows for radial deflection or displacement of the shaft without the shaft coming in contact with the bushing.

Another feature resides in the provision of an improved form of seal for forming a close restriction to flow along the shaft without the use of gasketing material, packing, or the like, and without segmenting the non-rotating ring and without holding this ring in contact with the shaft by spring means; also without inward pressure on the shaft.

Another feature of the present invention resides in the provision of a pin protruding from the stationary bushing for holding the ring against rotation with the shaft, or stationary with respect to rotation of the shaft.

Another feature resides in the provision in an improved form of seal of the character described of a spring, and more particularly a flat wavy spring, for holding the floating ring in close contact with the stationary seal bushing.

Another feature, particularly where the seal is used as an external seal, resides in the provision of a stationary seal bushing pressed at its outer side into a gland with the floating ring held stationary with respect to rotation of the shaft by a pin protruding from the stationary seal bushing, and spring means between the floating ring and an annular seal stationary seat for holding the floating ring in close contact with the stationary seal bushing.

Where the seal according to the present invention is used as an external seal, or as an auxiliary seal or throttle bushing externally of an inner seal, it provides a margin of safety when handling obnoxious, flammable, poisonous or explosive materials, or concentrated solutions. Should the internal seal fail, the improved seal according to the present invention, when used as an auxiliary seal, will reduce the leakage to atmosphere by virtue of the close fit of the floating ring around the shaft and vent opening between the inner seal and the auxiliary or external seal which may be piped out to a safe distance.

If desired, a fluid, or gas may be introduced between the inner seal and the outer seal, to act as a quench, or purge or to remove salts which might form at the outside of the inner seal from slight leakage and subsequent evaporation of the liquid so leaked.

Where, for example, a simple bushing is used in the gland, the same objections as are put forth against the simple bushing as an interstage seal are applicable, i.e., difficulty of obtaining a close enough fit to be effective and still be commercially obtainable.

Where the seal according to the present invention is used as an internal or interstage seal, the ring may be forced against the bushing by pressure from an adjacent stage with or without spring means for giving the initial positioning of the ring, and provides adequate sealing and an arrangement which will enable imposition of greater loads on the structure, and with which bending moments on the shaft are reduced.

Further features and numerous advantages and adaptations of the invention will be apparent from the following detailed description taken in connection with the accompanying drawings, it being understood that the invention is limited only within the scope of the appended claims and not to the particular embodiments selected for illustration In the drawings:
FIGURE 1 is a fragmentary sectional view illustrating the application of sealing means embodying the present invention as an external seal to the shaft of a pump; and
FIGURE 2 is a longitudinal sectional view illustrating the application of sealing means embodying the present invention as an external seal to the shaft of a pump; also as an internal or interstage seal, and as a seal for reducing the end thrust on the pump shaft.

Referring to the drawings for a detailed description, the pump shown fragmentary in FIGURE 1 has a casing designated by the numeral 1.

A turbine impeller 2 is fixed, for example, by a Woodruff key or spline 3 to rotate with the pump shaft 4. The impeller 2 rotates between inner and outer liners, the inner liner being shown at 5. The liners cooperate with the opposite sides of the impeller to form sealing surfaces, the inner sealing surface being indicated at 6.

The casing 1 has an inboard cover 7 interposed between the casing 1 and a frame 8. The frame 8 and inboard cover 7 are secured to the casing 1 by cap screws 9. The impeller 2 may constitute the first stage of a two stage turbine pump, or the turbine stage of a centrifugal-turbine pump, or may be the turbine stage of any other form of pump. Gasket means 10 is provided between the inboard cover 7 and the casing 1.

A shaft sleeve 11 surrounds the shaft 4 and at 12 abuts the inboard end of the impeller 2. The opposite end of the sleeve 11 abuts a shoulder 13 on the shaft 4. A stuffing box 14 is positioned with a gasket 15 between the inboard cover 7 and the stuffing box 14. A gland 16 is secured to the inboard cover 7 by cap screws 17. The enlarged diameter portion 18 of the shaft 4 is disposed within the gland 16. A further enlarged diameter portion 19 of the shaft 4 is journaled for rotation in an inboard bearing 20.

An annular water slinger 22 is provided about the portion 19 of the shaft 4 and an inner housing cap is provided at 23. A gasket 24 is provided between the cap 23 and the frame 8. The cap 23 is secured to the frame 8 by cap screws 25. A vent fitting is provided at 26.

An annular seal stationary seat 28 surrounds the sleeve 11 and has an external annular flange 29 positioned between the stuffing box 14 and the gland 16. Stationary seal gaskets 30 are interposed between the stuffing box 14 and one end of the annular flange 29 and between the gland 16 and the other end of the annular flange 29.

A seal rotating unit is provided at 32. This unit has pins 33 engaging in openings 34 in the impeller 2; also a seal carbon rotating washer 35 and a "Teflon" wedge gasket 36. Springs 37 act through the gasket 36 to hold the outboard end of the carbon rotating washer 35 in close contact with the annular seal stationary seat 28.

A stationary metal bushing 40 has its outside pressed into the gland 16 at 41. The bushing 40 is additionally held in place by an inwardly extending annular shoulder 42 on the outboard end of the gland 16. The bushing 40 constitutes the stationary seal bushing of the improved seal according to the present invention.

A floating seal ring 43, preferably formed of carbon, surrounds and has close fit on the shaft 4. The seal ring 43 is in the form of a single piece floating ring and without segmentation or spring means holding the same in contact with the shaft 4, and without pressure inward on the shaft. The floating carbon ring 43 is bored out to a much closer fit (.002 diametrical clearance) on the shaft 4 than would be allowable on the solid throttle bushing 40.

The carbon ring 43 is held from rotating, or stationary with respect to rotation of the shaft 4, by a pin 45 fixed in the bushing 40 at 46 and protruding from the fixed throttle bushing 40. The protruding end of the pin 45 engages in a groove 47 in the outer periphery of the floating carbon ring 43.

The carbon ring 43 is held with its outboard face in close contact with the inboard face of the bushing 40 by spring means indicated at 48. The spring means 48 is preferably in the form of a flat wavy spring 48 acting between the outboard face of the stationary seal seat 28 and the inboard face of the carbon ring 43. The spring means 48 could be in the form of coil springs, which are not as short, or of other form. This structure provides a simple non-deteriorating arrangement to overcome the difficulties previously encountered.

The pump is preferably provided with inner seal means, as shown in FIGURE 1, and the outer seal formed by bushing 40, carbon ring 43 and spring means 48 gives a margin of safety when handling obnoxious, flammable, poisonous, or explosive materials, or concentrated solutions. Should the internal seal fail, the external seal will reduce the leakage to atmosphere by virtue of the close fit around the shaft, and, if desired, vent openings 50 between the internal seal and the external seal which may be piped out to a safe distance. Also, if desired, a fluid or gas may be introduced between the inner seal and the outer seal, to act as a quench or purge, or to remove salts which might form at the outside of the inner seal from slight leakage and subsequent evaporation of the fluid so leaked.

The pump selected for illustration in FIGURE 2 is a two stage turbine pump having a casing designated in its entirety at 52.

Turbine impellers 53 and 54 are fixed, for example, by Woodruff keys or splines 55 and 56 to rotate with the shaft 57. The impeller 53 rotates between outer and inner liners 58 and 59 and the impeller 54 rotates between outer and inner liners 60 and 61. The liners 58 and 59 cooperate with the opposite sides of the impeller 53 to form sealing surfaces 62 and the liners 60 and 61 cooperate with opposite sides of the impeller 54 to form sealing surfaces 63.

An annular impeller spacer 64 is disposed between the hubs 65 and 66 of the impellers 53 and 54. The impeller 53 has vanes or blades 67 opening from the opposite sides and peripherally from the impeller 53 and operable within a liquid channel 68. The impeller 54 has vanes or blades 69 opening from opposite sides and peripherally from the impeller 54 and operable within a liquid channel 70.

The casing 52 has an outboard cover 71 secured to the casing by cap screws 72. The casing 52 also has an inboard cover 73 interposed between the casing 52 and a frame 74. The frame 74 and inboard cover 73 are secured to the casing 52 by cap screws 75. The impeller 54 constitutes the first stage of the pump for receiving liquid from the inlet and delivering same to the impeller 53 which constitutes the second stage and from which second stage the liquid is discharged through the pump outlet 76. Gaskets are provided at 77 and 78 between the outboard cover 71 and casing 52 and between the inboard cover 73 and the casing 52 respectively.

A shaft sleeve 80 surrounds the shaft 57 and at 81 abuts the inboard end of the impeller 54. The opposite end of the sleeve 80 abuts a shoulder 82 on the shaft 57. A stuffing box 83 is positioned with a gasket 84 between the inboard cover 73 and the stuffing box 83. A gland 85 secured to the inboard cover 73 by cap screws 86 has a stationary metal bushing 87 with its outside pressed into the gland 85 at 88. The bushing 87 is additionally held in place by an inwardly extending annular shoulder 89 on the outboard end of the gland 85. The bushing 87 constitutes the stationary seal bushing of the improved external seal according to the present invention.

A floating seal ring 90, preferably formed of carbon, surrounds and has close fit on the shaft 57. The seal ring 90 is in the form of a single piece floating ring and without segmentation or spring means holding the same in contact with the shaft 57, and without pressure inward on the shaft. As pointed out in connection with FIGURE 1, the floating carbon ring 90 is bored out to a much closer fit on the shaft 57 than would be allowable on the solid throttle bushing 87.

The carbon ring 90 is held from rotating, or stationary with respect to rotation of the shaft 4, by a pin 91 fixed in the bushing 87 at 92 and protruding from the fixed throttle bushing 87. The protruding end of the pin 91 engages in a groove 93 in the outer periphery of the floating carbon ring 90.

The carbon ring 90 is held with its outboard face in close contact with the inboard face of the bushing 87 by spring means indicated at 94. The spring means 94 is preferably in the form of a flat wavy spring 94 acting between the outboard face of a stationary seal seat 96 and the inboard face of the carbon ring 90. As in the embodiment of the invention illustrated in FIGURE 1 the spring means could be in the form of coil springs, which are not as short, or of other form. The seal comprising the bushing 87 and carbon ring 90 functions as does the embodiment of the invention illustrated in FIGURE 1, and provides the advantages previously described.

The annular member, or stationary seal seat 96 surrounds the sleeve 80 and has an annular flange 97 positioned between the stuffing box 83 and the gland 85. Stationary seal gaskets 98 are interposed between the stuffing box 83 and one end of the annular flange 97 and between the gland 85 and the other end of the annular flange 97.

A seal rotating unit is provided at 100. This unit has pins 101 engaging in openings 102 in the impeller 54; also a seal carbon rotating washer 103 and a "Teflon" wedge gasket 104. Springs 105 act through the gasket 104 to hold the outboard end of the carbon rotating washer 103 in close contact with the annular seal stationary seat 96.

A stationary metal bushing 108, similar to the bushing 87, has its outside pressed, for example, into the liner 60. The bushing 108 is additionally held in place by an inwardly extending annular shoulder 109 on the liner 60.

A floating seal ring 110, preferably formed of carbon, surrounds and has close fit on the hub 65 of the impeller 53. Like the seal ring 90, the seal ring 110 is in the form of a single piece floating ring without segmentation or spring means holding the same in contact with the hub 65, and without pressure on the hub. Like the floating carbon rings 43 and 90, the floating carbon ring 110 is bored out to a much closer fit on the hub 65 than would be allowable on the bushing 108.

The carbon ring 110 is held from rotating, or stationary with respect to rotation of the shaft 57, in the manner previously described, i.e., by a pin 112 fixed in the bushing 108 and protruding from the bushing 108. The protruding end of the pin 112 engages in a groove 113 in the outer periphery of the floating carbon ring 110. Spring means as previously described in connection with the springs 48 and 94 may, if desired, be employed for giving the initial positioning of the inner face of the ring 110 against the inner face of the bushing 108.

In the operation of the pump, the pressure from the second stage provided by the impeller 53 on the outboard end of the non-rotating ring 110 forces the ring 110 longitudially against the adjacent end of the stationary bushing 108 and thus seals off high pressure from the second turbine stage constituted by the impeller 53 from the first turbine stage constituted by the impeller 54.

The close fitting non-rotating ring 110 forms a close restriction to flow along the shaft 57 without the use of gasketing material. The clearance between the shaft or impeller hub 65 and the ring 110 may be much less than is practical with a stationary bushing alone. The interface between the ring 110 and the bushing 108 allows for radial deflection or a displacement of the shaft without the shaft coming into contact with the bushing 108.

In this embodiment of the invention, a stationary metal bushing 115, similar to the bushings 87 and 108, has its outside pressed, for example, into the outboard cover 71. A floating carbon seal ring 116, similar to the rings 90 and 110, fits closely about the hub of an impeller nut 118 which is screwed at 119 upon the shaft 57. The nut 118 rotates with the shaft 57 and holds the hubs of the impellers 53 and 54 and the spacer 64 in proper relation and between the nut 118 and the end of the sleeve 80.

The carbon ring 116 is held from rotating, or stationary with respect to rotation of the shaft 57, in the manner previously described, i.e., by a pin 120 fixed in the bushing 115 and protruding from the bushing 115. The protruding end of the pin 120 engages in a groove 121 in the outer periphery of the floating carbon ring 116.

In the operation of the pump, the pressure from the second stage provided by the impeller 53 on the inboard end of the non-rotating ring 116 forces the ring 116 longitudinally against the adjacent end of the bushing 115 and thus seals off high pressure from the space or chamber 122 at the end of the shaft 57.

As with the ring 110, the close fitting ring 116 together with the bushing 115 forms a close restriction to flow along the shaft without the use of gasketing material. The clearance between the shaft 57 or nut 118 and the ring 116 may be much less than is practical with a stationary bushing alone. The interface between the non-rotating ring 116 and the stationary bushing 115 also allows for radial deflection or displacement of the shaft. Spring means as previously described in connection with the springs 48 and 94 may, if desired, be employed for giving the initial positioning of the inner face of the ring 116 against the inner face of the bushing 115.

The shaft 57 also has an open longitudinal groove 124 which opens from the space 122 to a low pressure area provided by openings 125 through the sleeve 80. Thus, such pressure as may enter the space 122 is bled therefrom to a low pressure area 125, further to reduce end thrust on the shaft. The groove 124 extends from the space or chamber 122 sealed off at the end of the shaft to a low pressure area around the main interstage seal The pressure which enters the space 122 could, of course be piped off externally to a low pressure area. The arrangement described enables shortening the distance between the stages of the pump while maintaining adequate sealing. Greater loads may be imposed on the structure and bending moments on the shaft are reduced.

The improved form of seal of the present invention may be applied to other forms of pumps, for example, as disclosed in my previously identified copending application, or otherwise as desired.

The embodiments of the invention disclosed in the drawings and the specification are for illustrated purposes only, and it is to be especially understood that said drawings and the specification are not to be construed as a definition of the limits or scope of the invention, reference being had to the appended claims for that purpose

I claim:

1. In a pump, in combination, a pump casing, a pump shaft rotatable within said casing, impeller means fixed for rotation with said shaft within said casing for pumping a fluid, an abutment member surrounding said shaft, a first stationary member surrounding said shaft on the side of said abutment member toward said impeller means, a stationary gland member surrounding said shaft on the other side of said abutment member, double seals cooperating with said abutment member on opposite sides thereof and with one of said seals cooperating with said first stationary member and the other seal cooperating with said gland member, a stationary seal bushing surrounding said shaft and fixed in said gland member and held against rotation, a circumferentially continuous carbon radially floating ring surrounding and closely fitting said shaft within the pump casing, means for holding said carbon floating ring against rotation while permitting rotation of said shaft, and spring means acting between said abutment member and said carbon floating ring for holding said carbon floating ring in close contact with said stationary seal bushing.

2. A pump according to claim 1, wherein said means for holding the carbon floating ring against rotation while permitting rotation of the shaft comprises a pin fixed in the stationary seal bushing and engaging in a groove in the outer periphery of the carbon floating ring.

3. A pump according to claim 1, wherein an inner seal means is provided between the inner side of the abutment member and the impeller means.

4. A pump according to claim 1, wherein an inner seal means is provided between the inner side of the abutment member and the impeller means, said inner seal means comprising an inner seal rotating unit having pins engaging in openings in the impeller means, a carbon rotating washer, a wedge gasket, and spring means acting through said gasket to hold the outer end of the carbon rotating washer in close contact with the abutment member.

5. A pump according to claim 1, wherein the first stationary member and the gland member have vent openings opening therefrom.

6. A pump according to claim 1, said casing having cover means for the pump casing beyond the opposite side of the impeller means, said pump shaft terminating adjacent said cover means and having a nut thereon, a second stationary seal bushing fixed in said cover means and held against rotation, a second circumferentially continuous carbon radially floating ring surrounding said nut and subject to the pressure of the fluid pumped by said impeller means, and means for holding said second carbon floating ring against rotation, said second carbon floating ring being movable longitudinally against said second stationary seal bushing by the pressure of the fluid pumped by said impeller means to form a close restriction to flow along the shaft within the pump casing, said pump shaft having a bleedoff passage leading from the end of the pump shaft and to a low pressure area around the seal to reduce end thrust.

7. A pump according to claim 1, wherein the impeller means comprises a pair of impellers, liners cooperating with opposite sides of said impellers, a second stationary seal bushing fixed in one of the liners for one impeller and held against rotation by one of said liners, a circumferentially continuous carbon radially floating ring surrounding and closely fitting the hub of the other impeller, and means for holding the latter carbon floating ring against rotation, said latter carbon floating ring being exposed to pressure from said other impeller and forced against said second stationary seal bushing by said pressure to seal off the pressure from said other impeller.

References Cited by the Examiner

UNITED STATES PATENTS

| 2,319,776 | 5/43 | Copeland et al. | 103—96 |
| 2,809,854 | 10/57 | McGahan | 277—173 |
| 3,001,806 | 9/61 | Macks | 277—173 |
| 3,089,423 | 5/63 | Raub et al. | 103—114 |

FOREIGN PATENTS

| 785,993 | 5/35 | France. |

JOSEPH H. BRANSON, Jr., *Primary Examiner.*

SAMUEL E. ROTHBERG, *Examiner.*